April 13, 1965   H. J. KOZICKI   3,178,202
VEHICLE WHEEL SUSPENSION
Filed Dec. 4, 1961   2 Sheets-Sheet 2

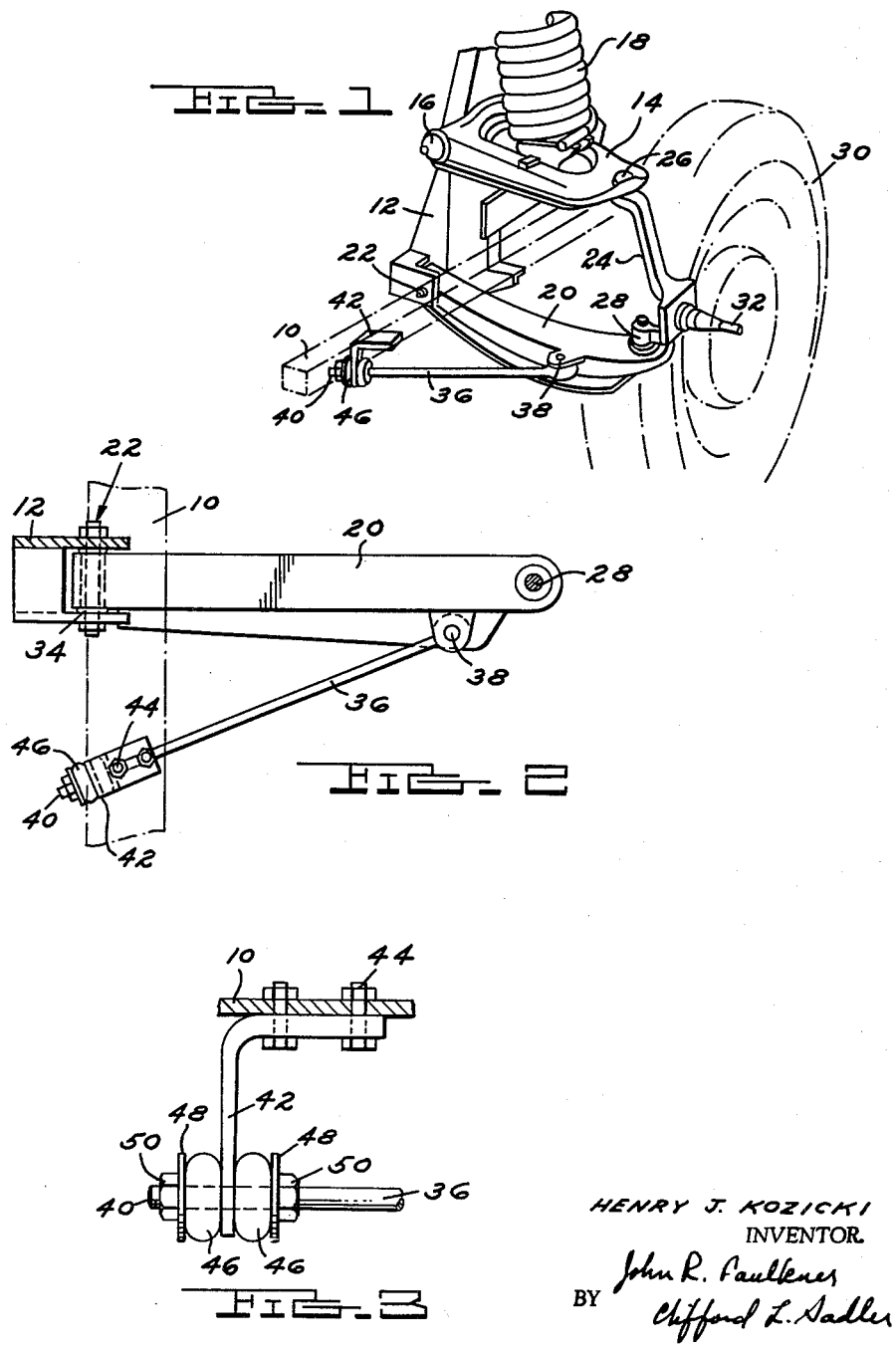

HENRY J. KOZICKI
INVENTOR.

BY John R. Faulkner
Clifford L. Sadler

ATTORNEYS

United States Patent Office 3,178,202
Patented Apr. 13, 1965

3,178,202
VEHICLE WHEEL SUSPENSION
Henry J. Kozicki, Orchard Lake, Mich., assignor to Ford Motor Company, Dearborn, Mich., a corporation of Delaware
Filed Dec. 4, 1961, Ser. No. 156,728
6 Claims. (Cl. 280—124)

The present invention relates generally to suspension systems for motor vehicles and more particularly to an improved suspension for the reduction of ride harshness.

It has been determined that a motor vehicle wheel, upon impact with a road obstacle, will encounter both horizontal and vertical component forces. The conventional vehicle suspension resiliently supports the wheel for vertical movement to absorb the vertical force component encountered. However, provisions are usually not made for absorption of the horizontal component and, therefore, impact of the road wheel with an obstacle will cause a shock producing ride harshness.

Therefore, it is a general object of the present invention to provide a suspension system for a motor vehicle that has flexibility and resiliency to absorb both vertical and horizontal forces. More specifically, the wheel support arms are pivotally connected to the sprung vehicle body to permit the wheels to traverse a vertical path in jounce and rebound as dictated by road conditions. Further, the present invention provides limited resilient movement of the wheel support structure in a rearward direction in response to horizontal forces. Such action is known as "wheel recession" or "wheel compliance."

In one embodiment of the invention, a lower suspension arm is connected to the chassis by a convention pivot having a rubber bushing. The arm is positioned in a longitudinal direction by a diagonally mounted drag strut. This construction permits the arm to move in jounce and rebound. The inner end of the drag strut is connected to the vehicle chassis by means of an intermediate spring metal strip that will allow the drag strut limited fore and aft movement for wheel recession purposes.

In another embodiment of the invention, a lower arm of an independent front suspension is provided with fore and aft pivot bushings. The forward bushing is connected to the arm by a vertical strip of spring metal. The flexibility of the spring metal strip permits the arm to rotate in a horizontal plane about the rear bushing.

The use of a spring metal strip in both embodiments permits resilient horizontal movement upon impact by the wheel with a road obstacle and further, because of the resiliency of the strip, the suspension arm is urged to its normal position after the horizontal force has been removed.

Therefore, one of the specific objects of the present invention is to provide a vehicle suspension system with a pivotally mounted suspension arm having a spring metal strip at one of the pivots to permit limited lateral wheel movement.

These and further objects of this invention will become amply apparent from the following discussion and the accompanying drawings, in which:

FIGURE 1 is a perspective view of an independent front suspension system incorporating an embodiment of this invention;

FIGURE 2 is a top plan view of the suspension arm and drag strut of FIGURE 1;

FIGURE 3 is an elevational view of the mounting construction of the drag strut of FIGURES 1 and 2;

Figure 4:
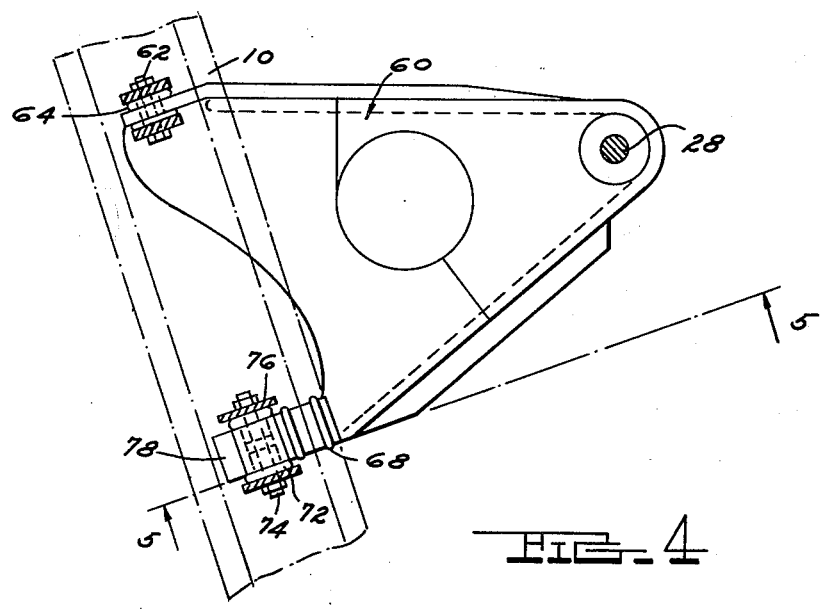
FIGURE 4 is a top plan view of a suspension arm incorporating the present invention in an alternate form; and, FIGURE 5 is a sectional view taken along section lines 5—5 of FIGURE 4.

Referring now to the drawings, wherein like reference numerals identify like parts throughout the various views, FIGURE 1 discloses in perspective an independent front suspension system for a motor vehicle. The suspension construction of FIGURE 1 includes a frame side rail 10 and a reinforced mounting structure 12. An upper suspension arm 14 is pivotally connected to the reinforced structure 12 by a pivot 16 in a conventional fashion.

A coil spring 18 is seated upon the arm 14 at its lower end and is seated at its upper end in body structure. The spring 18 provides resilient support of the body upon the unsprung portion of the suspension system.

A lower suspension arm 20 is pivotally connected at its inner end by a rubber bushing 22 to the reinforcing structure 12. The outer ends of the upper and lower arms 14, 20 are connected to the upper and lower ends of a wheel carrier 24 by means of upper and lower ball joints 26 and 28. A road wheel 30 is rotatably mounted upon a shaft 32 extending from the carrier 24.

This construction permits the wheel 30 to move vertically in jounce and rebound as the arms 14 and 20 rotate about their pivots 16 and 22 in response to impact of the wheel 30 with road obstacles. The rebound and jounce movements are cushioned by the spring 18.

The inner pivot 22 of the lower arm 20 includes a cylindrical rubber element 34. The pivot 22 is relatively narrow, and because it includes a rubber bushing 34, the arm 20 can rotate slightly in a longitudinal direction. In order to stabilize the arm and maintain a correct longitudinal location, a drag strut 36 is provided. The drag strut 36 has a pivotal connection 38 with the outer end of the arm 20. The drag strut 36 is diagonally disposed and has an inner pivot situated in front of pivot 22 of the arm 20. The construction at the inner pivot is best seen in FIGURE 3.

The drag strut 36 is formed of bar stock and has an end portion 40 that is threaded. The frame side rail 10 has an L-shaped spring metal piece 42 secured thereto by means of bolts 44. The major leg of the spring metal piece 42 extends downwardly and has an opening through which the threaded end 40 of the drag strut 36 passes. Doughnut shaped rubber elements 46 are positioned about the strut end 40 on either side of the opening in spring piece 42. The doughnut-shaped rubber pieces 46 are maintained in position by a pair of washers 48 and a pair of nuts 50 threaded on the end 40. The nuts 50 may be adjusted to obtain the proper positioning of the drag strut 36 and the proper preloading of the rubber elements 46.

As previously explained, jounce and rebound movement of the wheel 30 will cause the arms 14 and 20 to rotate about their inner pivots 16 and 22. When the wheel 30 strikes a road obstacle, in addition to the vertical force components causing the vertical movements, horizontal forces are created that tend to pivot the arm 20 about its inner pivot 22 in a horizontal plane. Such action is restricted by the drag strut 36. The drag strut's inner support includes the resilient spring metal strip 42 and thus, the strip 42 will deflect resiliently to permit the strut 36 and 20 to move horizontally. This movement provides wheel recession for the absorption of horizontal forces and shocks. In addition to allowing the wheel recession, spring metal strip 42 resiliently urges the arm 20 to return to its normal position when the horizontal force has subsided.

Figure 5:
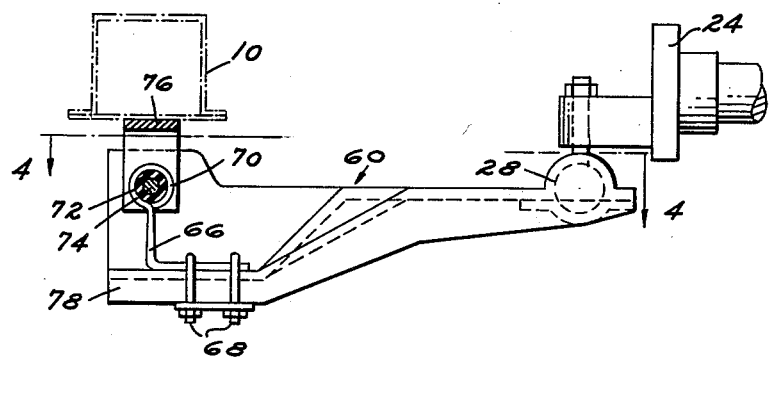

FIGURES 4 and 5 illustrate an alternate embodiment of the present invention. In FIGURE 4, a lower suspension arm 60 is connected to the frame side rail 10 by a rearward pivot 62 having a rubber bushing 64. The outer end of the arm is connected to the ball joint assembly 28 of a wheel carrier 24. The forward end of the arm 60 has an L-shaped spring metal piece 66 secured thereto.

The foot portion of the spring piece 66 is connected to the arm 60 by a pair of U-bolts 68. The spring piece 66 has an upstanding leg portion with a pivot eye 70 formed therein. The eye 70 surrounds a rubber bushing 72 and a pivot shaft 74 that is connected to a pivot bracket 76. The pivot bracket 76 is carried by the side rail 10.

In order to accommodate this construction the suspension arm 60 has a portion 78 extending therefrom at a level lower than the body of the arm 60. The protruding leg 78 provides a location for connecting the spring metal piece 66 and securing the U-bolt 68. The pivot shaft 74 of the forward pivot is in line with the pivot 62 so that the arm 60 will deflect in jounce and rebound in a conventional fashion.

With this construction, when the wheel 30 strikes an obstacle in the road creating horizontal forces, the arms 60 will tend to rotate about its rear pivot 62. The tendency of the arm 60 to rotate will cause the upstanding portion of the spring metal piece 66 to flex to permit horizontal arm movement and wheel recession. The resiliency of the piece 66 will urge the arm 60 to return to its normal position when the forces are removed.

The foregoing description presents the presently preferred embodiments of this invention. Modifications and alterations may occur to those skilled in the art which will come within the scope and spirit of the following claims.

I claim:

1. A vehicle having sprung and unsprung components, a suspension arm interconnecting said components, said arm having spaced apart fore and aft pivot bushings, both of said bushings being adapted to permit both vertical and horizontal movement of said arm, a metal piece having a flat vertically extending leaf spring portion, said piece having one end connected to one of said bushings and the other of its ends connected to said arm, said metal piece being adapted to permit horizontal resilient movement of said arm.

2. In an automotive vehicle the combination comprising a road wheel, a support member, a wheel positioning member, means for rotatably supporting said road wheel from said wheel positioning member, means for pivotally supporting said wheel positioning member from said support member at a pair of spaced locations on said support member to permit relative vertical movement between said wheel and said support member, said just mentioned means including a leaf spring means interposed between said wheel positioning member and said support member and adapted to permit said wheel positioning member to move horizontally relative to said support member in response to a longitudinal force upon said wheel, said leaf spring means being pivotally connected to one of said members and rigidly secured to the other of said members.

3. In an automotive vehicle the combination comprising a frame member, a road wheel, a wheel positioning member rotatably supporting said road wheel, means for pivotally supporting said wheel positioning member from a pair of spaced locations on said frame member to permit upward movement of said road wheel relative to said frame member, said means including wheel recession means adapted to permit the portion of said wheel positioning member positioned adjacent one of said spaced locations to traverse a horizontal path in response to a longitudinal force upon said wheel, said wheel recession means comprising a flat spring metal strip suspending a portion of said wheel positioning member from said frame member, said strip being pivotally connected to one of said members and rigidly secured to the other of said members.

4. In an automotive vehicle the combination comprising a frame member, a road wheel, a wheel positioning member rotatably supporting said road wheel, means for pivotally supporting said wheel positioning member from a pair of spaced locations on said frame member to permit upward movement of said road wheel relative to said frame member, said means including wheel recession means adapted to permit the portion of said wheel positioning member positioned adjacent one of said spaced locations to traverse a horizontal path in response to a longitudinal force upon said wheel, said wheel recession means comprising a flat spring metal strip suspending a portion of said wheel positioning member from said frame member, said strip being pivotally connected to said wheel positioning member and rigidly secured to said frame member.

5. In an automotive vehicle the combination comprising a frame member, a road wheel, a wheel positioning member rotatably supporting said road wheel, means for pivotally supporting said wheel positioning member from a pair of spaced locations on said frame member to permit upward movement of said road wheel relative to said frame member, said means including wheel recession means adapted to permit the portion of said wheel positioning member positioned adjacent one of said spaced locations to traverse a horizontal path in response to a longitudinal force upon said wheel, said wheel recession means comprising a flat spring metal strip suspending a portion of said wheel positioning member from said frame member, said strip being pivotally connected to said frame member and rigidly secured to said wheel positioning member.

6. In an automotive vehicle the combination comprising a frame member, a pair of road wheels, a pair of wheel support members each rotatably supporting one of said wheels, wheel positioning members connected to said support members, means for pivotally supporting said wheel positioning members from a pair of spaced locations on said frame member to permit independent upward movement of each of said road wheels relative to said frame member, said means including wheel recession means adapted to permit the portions of said wheel positioning members positioned adjacent to each of said spaced locations to traverse a horizontal path in response to a longitudinal force upon each of said wheels, said wheel recession means each comprising a flat spring metal strip suspending a portion of one of said wheel positioning members from said frame member, said strip being pivotally connected to one of said wheel positioning and frame members and rigidly secured to the other of said wheel positioning and frame members.

References Cited by the Examiner

UNITED STATES PATENTS

| | | | |
|---|---|---|---|
| 1,546,759 | 7/25 | Silver | 267—67 |
| 2,675,225 | 4/54 | Migny | 267—1 |
| 3,083,032 | 3/63 | Cuskie | 280—96.2 |

FOREIGN PATENTS 700,840 12/53 Great Britain.

OTHER REFERENCES

S.A.E. Journal, April 1960, page 55.
Automotive Industries, June 1, 1957, page 58.

A. HARRY LEVY, *Primary Examiner.*

LEO FRIAGLIA, *Examiner.*